United States Patent
Vanevenhoven et al.

(10) Patent No.: US 11,387,765 B2
(45) Date of Patent: Jul. 12, 2022

(54) SPEED BASED GAIN CORRECTION FOR THREE LEVEL INVERTER MIDPOINT CONTROL

(71) Applicant: Hamilton Sundstrand Corporation, Charlotte, NC (US)

(72) Inventors: Jordan K. Vanevenhoven, Rockford, IL (US); Curtis J. Plude, Gresham, OR (US); Gary L. Miles, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 166 days.

(21) Appl. No.: 16/817,977

(22) Filed: Mar. 13, 2020

(65) Prior Publication Data
US 2021/0288605 A1    Sep. 16, 2021

(51) Int. Cl.
*H02P 27/14* (2006.01)
*H02M 1/15* (2006.01)
*H02M 7/483* (2007.01)
*H02M 7/515* (2007.01)

(52) U.S. Cl.
CPC ............ *H02P 27/14* (2013.01); *H02M 7/483* (2013.01); *H02M 7/515* (2013.01)

(58) Field of Classification Search
CPC .................................. H02P 27/17; H02M 1/08
See application file for complete search history.

(56) References Cited

U.S. PATENT DOCUMENTS

| | | | |
|---|---|---|---|
| 10,075,119 B2 | 9/2018 | Schmitt et al. | |
| 10,224,830 B2 | 3/2019 | Basic et al. | |
| 10,523,130 B2 | 12/2019 | Bax et al. | |
| 2011/0141786 A1* | 6/2011 | Shen | H02M 7/487 363/131 |
| 2016/0268950 A1* | 9/2016 | Cho | H02M 7/487 |
| 2019/0229643 A1 | 7/2019 | Bax et al. | |

FOREIGN PATENT DOCUMENTS

| | | |
|---|---|---|
| EP | 3288168 A1 | 2/2018 |
| WO | 2019137916 A1 | 7/2019 |

OTHER PUBLICATIONS

EP Search Report; dated Jul. 22, 2021; Application No. 21162329.3; Filed: Mar. 12, 2021; 8 pages.

\* cited by examiner

*Primary Examiner* — Muhammad S Islam
*Assistant Examiner* — Charles S Laughlin
(74) *Attorney, Agent, or Firm* — Cantor Colburn LLP

(57) ABSTRACT

A system and method for controlling a DC midpoint terminal voltage of a three level inverter is provided. The method includes receiving an input power signal at a three level motor control system that includes a three level inverter, the three level inverter powering an electric motor, determining, in the three level motor control system, a speed value of the electric motor, and adjusting a zero-sequence inverter output voltage to adjust a midpoint voltage at the DC midpoint based on the determined speed value.

18 Claims, 4 Drawing Sheets

SPEED BASED GAIN CORRECTION FOR THREE LEVEL INVERTER MIDPOINT CONTROL

BACKGROUND

The subject matter disclosed herein generally relates to a three level inverter midpoint and, more particularly, to controlling voltage at the DC midpoint of the three level inverter.

Three level inverters have a DC midpoint terminal in addition to a DC positive and a DC negative terminal. Because of the particular arrangement of the DC midpoint, the DC midpoint node voltage is not controlled by a power source. Therefore, the DC midpoint node voltage can move relative to ground. This imbalance is minimized in order to maintain output current power quality and limit insulated-gate bipolar transistor (IGBT) and DC capacitor voltage stress.

Therefore, one or more methods and system elements have been developed to control the DC midpoint voltage. For example, one method of controlling the DC midpoint voltage of a three-level inverter is to utilize a PI regulator. Specifically, the input to the PI regulator is the error in the DC midpoint voltage. A zero-sequence voltage, proportional to the PI regulator output, is applied on the inverter output to reduce the error in the DC midpoint voltage. This loop gain increases as the output power of the inverter increases. Consequently the system may grow unstable at different operating points.

Accordingly for at least the above discussed reasons, as well as others, there is a desire to provide improved control methods for a three level inverter DC midpoint voltage.

BRIEF DESCRIPTION

According to one embodiment a method of balancing a DC midpoint of a three level inverter is provided. The method includes receiving an input power signal at a three level motor control system that includes a three level inverter, the three level inverter powering an electric motor, determining, in the three level motor control system, a speed value of the electric motor, and adjusting a zero-sequence inverter output voltage to adjust a midpoint voltage at the DC midpoint based on the determined speed value.

According to another embodiment, a three level motor controller system for balancing a DC midpoint of a three level inverter is provided. The three level motor controller system includes receiving an input power signal at a three level motor control system that includes a three level inverter, the three level inverter powering an electric motor, determining, in the three level motor control system, a speed value of the electric motor, and adjusting a zero-sequence inverter output voltage to adjust a midpoint voltage at the DC midpoint based on the determined speed value.

According to another embodiment, a computer program product for balancing a DC midpoint of a three level inverter in a three level motor controller system is provided. The computer program product including a computer readable storage medium having program instructions embodied therewith, the program instructions executable by a processor and the system to cause the system and processor to instruct, using the processor, a power source to provide receiving an input power signal at a three level motor control system that includes a three level inverter, the three level inverter powering an electric motor, determining, in the three level motor control system, a speed value of the electric motor, and adjusting a zero-sequence inverter output voltage to adjust a midpoint voltage at the DC midpoint based on the determined speed value.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
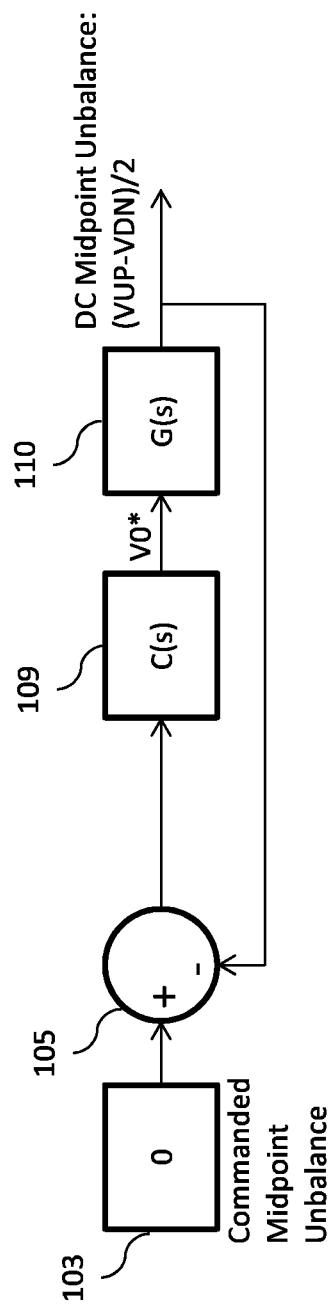
FIG. 1 depicts a schematic block diagram of three-level inverter DC midpoint control system.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to utilizing an electric motor and means to monitor motor speed either through direct sensing or indirect methods such as estimators or observers (using algorithms or electronic circuitry) to control a three level inverter in order to compensate for midpoint ripple characteristics associated with the speed of an AC motor.

A three level inverter switches its output between a DC positive point, a DC negative point, and a DC midpoint, which is not controlled by a voltage source. Because of this, the DC midpoint can move relative to the DC positive and negative points causing an imbalance. This imbalance is desired to be minimized to maintain power quality and limit switch and DC link capacitor stress. Typically, three level inverter midpoint control algorithms can use constant loop gains for control, or feature variable gains based on power estimation as a corrective input.

Methods and system elements have been developed to control the DC midpoint voltage. For example, one method of controlling the DC midpoint voltage of a three-level inverter is to utilize a PI regulator. The input to the PI regulator is the error in the DC midpoint voltage. A zero-sequence voltage, proportional to the PI regulator output, is applied to the inverter output to reduce the error in the DC midpoint voltage. This loop gain increases as the output power of the inverter increases. Consequently, the system may grow unstable at different operating points. Further, the three level inverter does not take into account midpoint ripple characteristics associated with the speed of the load (e.g., AC motor speeds) and associated fundamental frequency of the output. For a given PI tuning, at low frequencies, the midpoint voltage may feature high harmonic content which is undesirable. As frequency increases, this behavior improves and the ripple becomes sinusoidal and the magnitude of the ripple is reduced. Lowering the gains of the PI controller shows reduced harmonics at low frequencies; however, at higher frequencies, the controller may not be able to respond to system dynamics resulting in the introduction of significant DC midpoint transients at these higher frequencies. A new approach is desired to improve harmonic content at low frequencies and avoid DC drift at high speeds.

To address this, aspects of the present disclosure provide for a speed-based gain correction that is added to a DC link midpoint controller to achieve improved performance at high and low frequencies. Previous approaches typically resulted in either harmonic content at low frequencies or low large DC drift transients at high frequencies depending on if a controller was tuned with high or low gains. Aspects of the present disclosure address these shortcomings by allowing for low harmonic content at low frequencies using low gains and small DC drift transients at high frequencies using high gain.

Turning now to the figures, FIG. 1 depicts a schematic block diagram of a three-level inverter DC midpoint control system.

The diagram initially shows a setting of a desired midpoint unbalanced value to zero volts (103). Next the processing flow of the system includes calculating a first temporary error value by subtracting a DC midpoint unbalanced value from the desired midpoint unbalanced value (105). Further, the DC midpoint unbalanced value is equal to VUP minus VDN, divided by two. The processing flow further includes generating, using a regulator transfer function (C(s)), a commanded zero sequence voltage (VO*) based on the first temporary value (109). Finally, the processing flow of the system includes the open loop dynamics (G(s)) between the commanded zero sequence voltage (VO*) and the DC midpoint unbalanced value (110).

Figure 2:
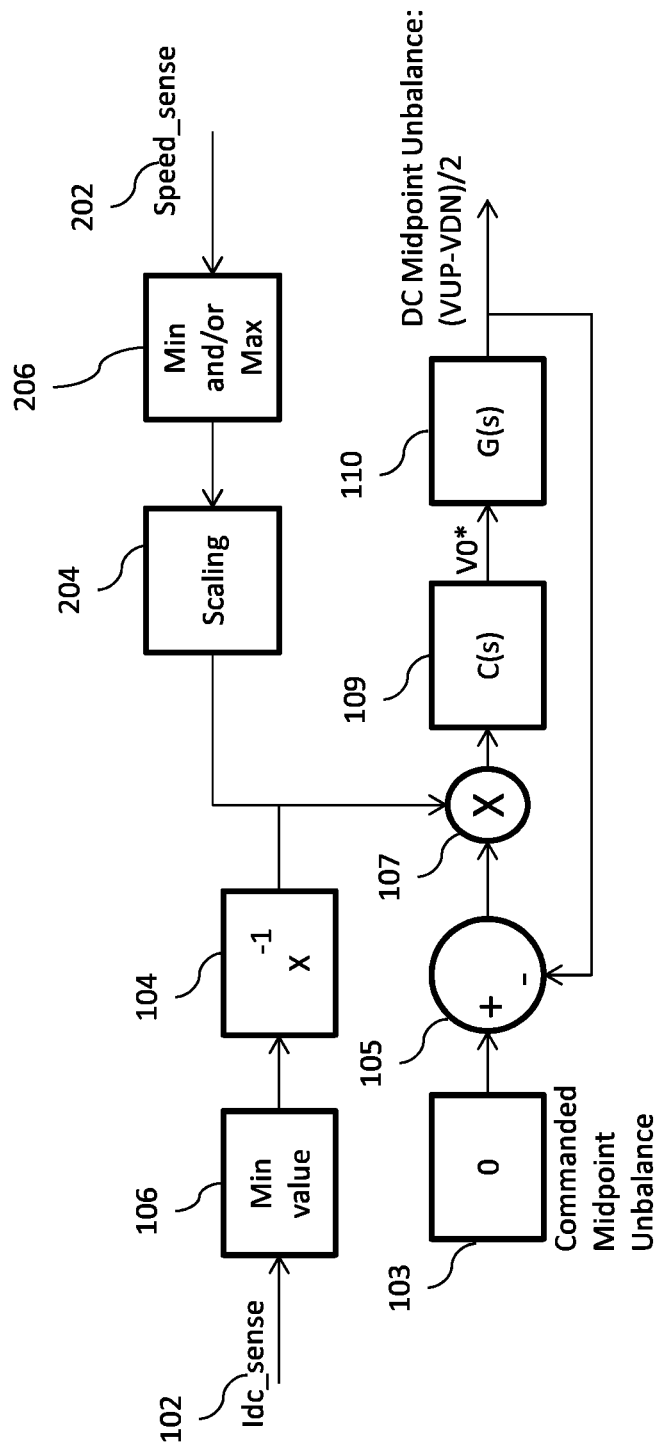
FIG. 2 depicts a schematic block diagram of a three-level inverter DC midpoint control system in accordance with one or more embodiments.

FIG. 2 depicts a schematic block diagram of three-level inverter DC midpoint control system in accordance with one or more embodiments of the present disclosure. Similar to FIG. 1, the diagram in FIG. 2 initially shows a setting of a desired midpoint unbalanced value to zero volts (103). Next the processing flow of the system includes calculating a first temporary error value by subtracting a DC midpoint unbalanced value from the desired midpoint unbalanced value (105). Further, the DC midpoint unbalanced value is equal to VUP minus VDN, divided by two. According to other embodiments, the processing flow further includes generating, using a regulator transfer function (C(s)), a commanded zero sequence voltage (VO*) based on a second temporary value (109). Finally, the processing flow of the system includes the inherent open loop gain (G(s)) between the commanded zero sequence voltage (VO*) and the DC midpoint unbalanced value (110).

Further, in contrast to FIG. 1 and in accordance with one or more embodiments, the diagram shows the system receiving a speed value (speed_sense) from a speed sensor (202) or from an estimator or observer (using an algorithm or electronic circuitry) that extracts speed without a sensor. The measured speed can be in any measured value including, but not limited, revolutions per minute (RPM) or radians per second (Rad/s). The system determines if the speed value is within a minimum and maximum value (206). Additionally, the system uses processing elements to scale the speed measurement (204). The system then generates the second temporary value by scaling (107) the error value (105) based on the speed of a motor. To achieve a desired minimum and maximum equivalent PI, the error can be scaled (107) based on a minimum and maximum speed (206) and additional scaling (204). Additionally, in one or more embodiments, a look up table can be utilized such that the PI is corrected as different rates for different speed ranges. For example, 204 and 206 can be implemented using a look up table with a saturation function to limit the minimum output to 0.5 and the maximum output to 1, such that at the low end of the range it produces a 0.5× multiplier to the output of the 105 block, and at the high end it produces a 1× multiplier to the output of the 105 block. This would effectively result in 0.5× the PI gains at low speeds, and 1× the PI gains at higher speeds. This type of function could be performed in the controller 185 using software/firmware or implemented in analog circuits using op amps and other electronic components.

In one or more embodiments, the diagram also shows the system receiving a measured DC current (Idc_sense) from a current sensor (102). Also, the system determines if the inverted DC current is below a minimum value, and adjusts the inverted DC current value equal the minimum value if the inverted DC current is determined to be below the minimum value (106). Additionally, the system uses a processing element to invert the measured DC current (104).

In one or more embodiments, this system then can further generate the second temporary value by multiplying the first temporary error value by the inverted and value limited DC current (107). The contribution (scaling) from blocks 106/104 can cancel out changes in 110 that would vary with power, whereas the blocs 202/204/206 input is looking at DC midpoint balance characteristics related to speed of an AC motor. The use of min/max limits in block 106 and block 206 could be used to limit this interaction. The open loop gain (G(s)) increases linearly with power. In contrast, the inverted DC current decreases linearly with power. Accordingly, combining the G(s) and the inverted DC current maintains a loop gain that is constant over power.

Figure 3:
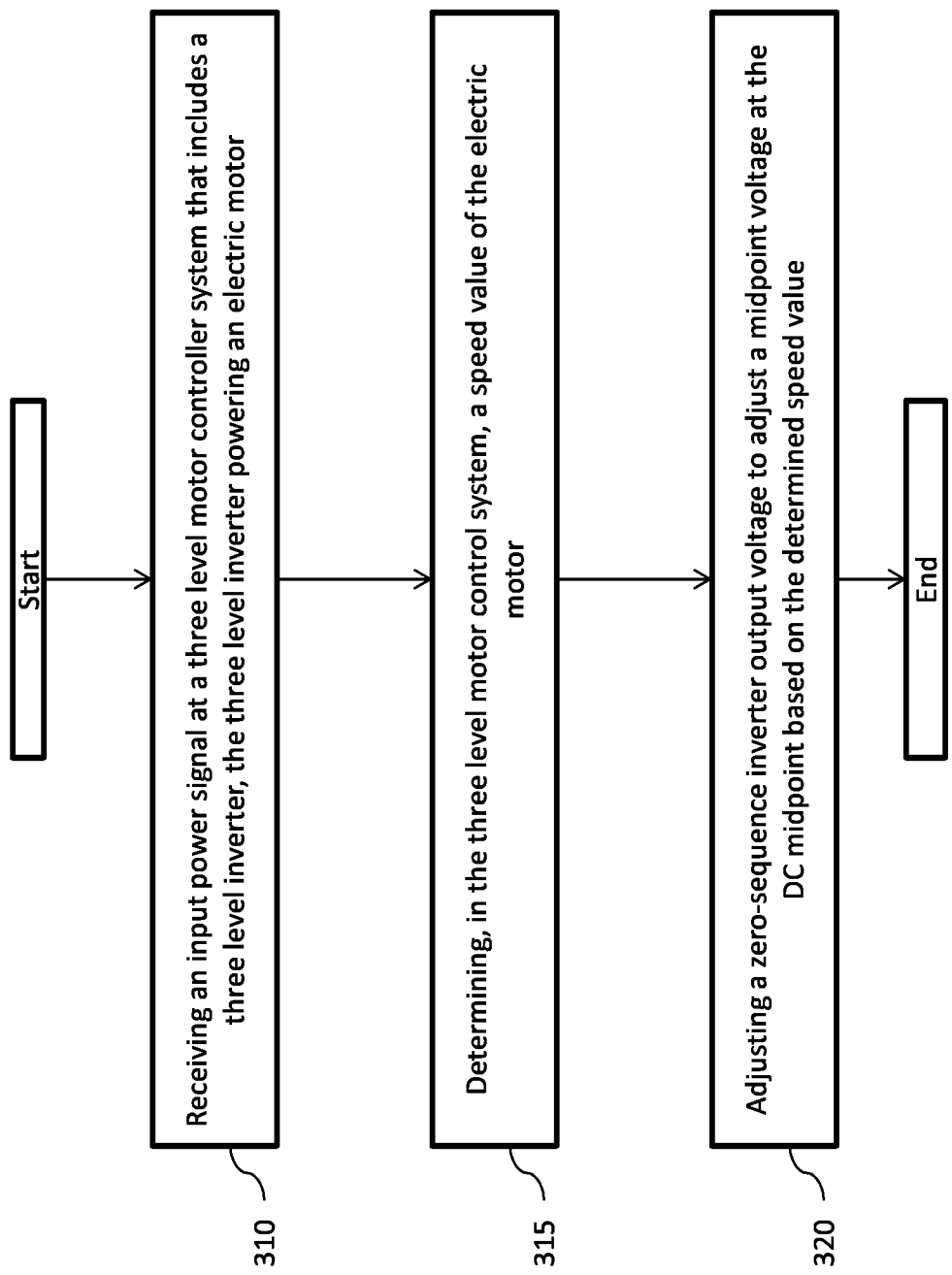
FIG. 3 is a flowchart of a method of balancing a DC midpoint of a three level inverter in accordance with one or more embodiments.

FIG. 3 is a flowchart of a method of balancing a DC midpoint of a three level inverter in accordance with one or more embodiments of the present disclosure. The method includes receiving an input power signal at a three level motor controller system that includes a three level inverter, the three level inverter powering an electric motor (operation 310). Also, the method includes determining, in the three level motor control system, a speed value of the electric motor (operation 315). The speed value can be determined utilizing a speed sensor or determined by an estimator or observer function. Finally, the method includes adjusting a zero-sequence inverter output voltage to adjust a midpoint voltage at the DC midpoint based on the determined speed value (operation 320).

According to other embodiments, the method can further include receiving the input power signal at the three-level inverter and providing an output power signal processed by the three-level inverter. Further, according to an embodiment the input power signal is a DC signal with a constant voltage from a power source, and wherein the output power signal is an AC signal provided to a load device.

Figure 4:
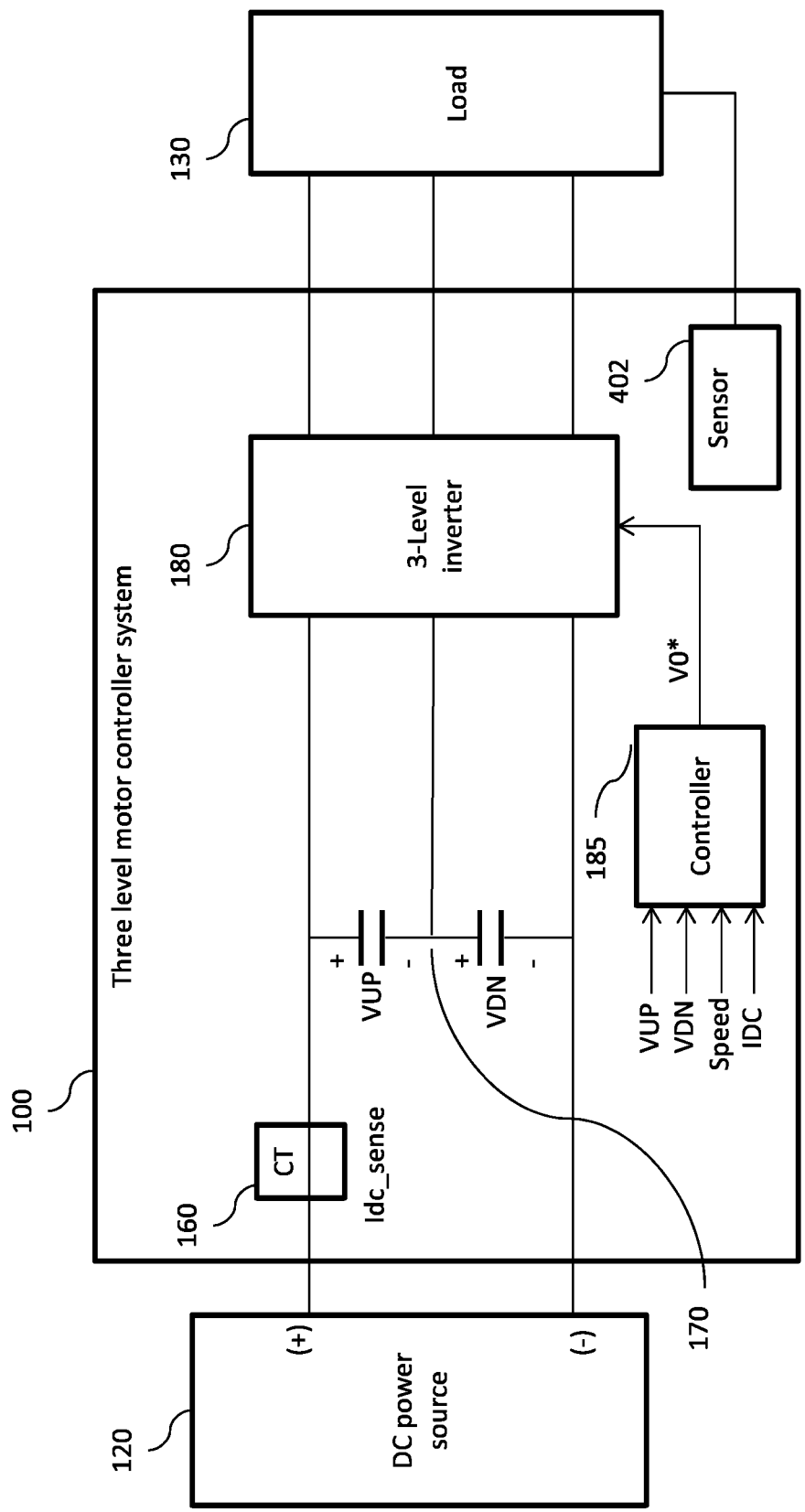
FIG. 4 is a block diagram of a three level motor controller system for balancing a DC midpoint of a three level inverter in accordance with one or more embodiments.

FIG. 4 is a block diagram of a three level motor controller system 100 for balancing a DC midpoint 170 of a three level inverter 180 in accordance with one or more embodiments of the present disclosure. The three level motor control system 100 includes a sensor 402 that is coupled to the load 130 for the three level inverter 180. In one or more embodiments, the speed of an AC motor load (load 130) can be determined utilizing the sensor 402 or determined without a sensor 402 and is calculated from either an estimator or observer function. The sensor 402 measures the speed of the load (AC motor) 130. The three level motor controller system 100 includes a three level inverter 180 and DC link capacitors VUP and VDN associated with the three level inverter 180. The three level inverter 180 includes DC input terminals including a DC midpoint 170 at the input terminals and AC output terminals.

According to one or more embodiments, a controller 185 adjusts a zero-sequence voltage output that adjusts a midpoint voltage at the DC midpoint 170 based on the measured speed of the AC motor taken from the speed sensor 402 for the load 130. In one or more additional embodiments, the controller 185 can further adjust the zero-sequence voltage output that adjusts the midpoint voltage at the DC midpoint 170 based on a measured DC current taken from a current sensor 160 at the output of the DC power source 120

According to one or more embodiments, the controller 185 adjusts a zero-sequence voltage (VO*) output that adjusts a midpoint voltage at the DC midpoint 170 based on the measured speed value. For example, 204 and 206 can be implemented using a look up table with a saturation function to limit the minimum output to 0.5 and the maximum output to 1, such that at the low end of the range it produces a 0.5× multiplier to the output of the 105 block, and at the high end it produces a 1× multiplier to the output of the 105 block. This would effectively result in 0.5× the PI gains at low speeds, and 1× the PI gains at higher speeds. This type of function could be performed in the controller 185 using software/firmware or implemented in analog circuits using op amps and other electronic components. Further, according to an embodiment the input power signal is a DC signal with a constant voltage from a power source, and wherein the output power signal is an AC signal provided to a load device.

Further, according to other embodiments, the three level motor controller 100 includes a first filter 140 that can also be called input filters 140. The input filters 140 include one or more signal filters. Further, the three level motor controller 100 also includes a second filter that can also be called output filters 150.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, in accordance with an exemplary embodiment, the PI regulator, C(s), and proportional gain can be varied during operation in order to maintain the overall loop gain approximately constant. This may be referred to as gain scheduling. The current disclosure utilizes both a DC current sensor in order to compensate for loop gain change as a function of power, and also a speed sensor or speed signal based on an estimator or observer function (using an algorithm or electronic circuitry) to compensate by improving harmonic content at low motor speeds and avoiding DC drift at high motor speeds.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method of balancing a DC midpoint of a three level inverter, the method comprising:
   receiving an input power signal at a three level motor control system that includes a three level inverter, the three level inverter powering an electric motor;
   determining, in the three level motor control system, a speed value of the electric motor; and
   adjusting a zero-sequence inverter output voltage to adjust a midpoint voltage at the DC midpoint based on the determined speed value, wherein adjusting the zero-sequence inverter output voltage from the three level inverter to adjust the midpoint voltage based on the determined speed value further comprises:
   setting a desired midpoint unbalanced value to zero volts;
   calculating a first temporary value by subtracting a DC midpoint unbalanced value from the desired midpoint unbalanced value, wherein the DC midpoint unbalanced value is equal to a first voltage value for a capacitor VUP minus a second voltage value for a capacitor VDN, divided by two;
   scaling the determined speed value;
   generating a second temporary value by multiplying the first temporary value by the scaled determined speed value;
   generating, using a regulator transfer function (C(s)), a commanded zero sequence inverter output voltage (VO*) based on the second temporary value; and
   applying the commanded zero sequence inverter output voltage to the three level inverter with open loop gain G(s), resulting in alteration of the DC midpoint voltage.

2. The method of claim 1, wherein the speed value of the electric motor is determined by a speed sensor.

3. The method of claim 1, wherein the speed value of the electric motor is determined by an estimator or observer function.

4. The method of claim 1, further comprising:
   receiving the input power signal at the three level inverter; and
   outputting an output power signal processed by the three-level inverter, wherein the output power signal is an inverter power flow.

5. The method of claim 4, wherein the input power signal is a DC power signal with a constant voltage from a power source, and wherein the output power signal is an AC power signal provided to a load device.

6. The method of claim 1, wherein scaling the determined speed value further comprises:
   determining that the speed value is below a minimum value;
   adjusting a speed of the electric motor to equal the minimum value.

7. The method of claim 1, wherein scaling the determined speed value further comprises:
   determining that the speed value is above a maximum value; and
   adjusting a speed of the electric motor to equal the maximum value.

8. The method of claim 1, wherein the midpoint voltage is equal to one-half of the difference between the voltage across an upper DC link capacitor (VUP) and the voltage across a lower DC link capacitor (VDN).

9. The method of claim 1, wherein a load on the three level inverter comprises the electric motor.

10. A three level motor controller system for balancing a DC midpoint of a three level inverter, the three level motor controller system comprising:
    a controller configured to:
    receive an input power signal at the three level motor control system that includes a three level inventor, the three level inverter powering an electric motor;
    determine a speed value of the electric motor;
    adjust a zero-sequence inverter output voltage to adjust a midpoint voltage at the DC midpoint based on the determined speed value, wherein adjusting the zero-sequence inverter output voltage from the three level inverter to adjust the midpoint voltage based on the determined speed value further comprises:
    setting a desired midpoint unbalanced value to zero volts;
    calculating a first temporary value by subtracting a DC midpoint unbalanced value from the desired midpoint unbalanced value, wherein the DC midpoint unbalanced value is equal to a first voltage value for capacitor VUP minus a second voltage value for capacitor VDN, divided by two;
    scaling the determined speed value;
    generating a second temporary value by multiplying the first temporary value by the scaled determined speed value;
    generating, using a regulator transfer function (C(s)), a commanded zero sequence inverter output voltage (VO*) based on the second temporary value; and
    applying the commanded zero sequence inverter output voltage to the three level inverter with open loop gain G(s), resulting in alteration of the DC midpoint voltage.

11. The three level motor control system of claim 10, wherein the speed value of the electric motor is determined by a speed sensor.

12. The three level motor control system of claim 10, wherein the speed value of the electric motor is determined by an estimator or observer function.

13. The three level motor control system of claim 10, wherein the controller is further configured to:
   receive the input power signal at the three level inverter; and
   output an output power signal processed by the three-level inverter, wherein the output power signal is an inverter power flow.

14. The three level motor control system of claim 10, wherein the input power signal is a DC power signal with a constant voltage from a power source, and
   wherein the output power signal is an AC power signal provided to a load device.

15. The three level motor control system of claim 1, wherein scaling the determined speed value further comprises:
   determining that the speed value is below a minimum value; and
   adjusting a speed of the electric motor to equal the minimum value.

16. The three level motor control system of claim 1, wherein scaling the determined speed value further comprises:
   determining that the speed value is above a maximum value; and
   adjusting a speed of the electric motor to equal the maximum value.

17. A computer program product for balancing a DC midpoint of a three level inverter in a three level motor controller system, the computer program product comprising a computer readable storage medium having program instructions embodied therewith, the program instructions executable by a processor and the system to cause the system and processor to:
   instruct, using the processor, a power source to provide an input power signal to the three level motor controller system;
   receive the input power signal at the three-level motor controller system that includes a three level inverter, the three level inverter powering an electric motor;
   determining, in the three level motor control system, a speed value of the electric motor;
   adjust a zero-sequence inverter output voltage from the three level inverter to adjust a midpoint voltage at the DC midpoint based on the determined speed, wherein adjusting the zero-sequence inverter output voltage from the three level inverter to adjust the midpoint voltage based on the determined speed value further comprises:
      setting a desired midpoint unbalanced value to zero volts;
      calculating a first temporary value by subtracting a DC midpoint unbalanced value from the desired midpoint unbalanced value, wherein the DC midpoint unbalanced value is equal to a first voltage value for capacitor VUP minus a second voltage value for capacitor VDN, divided by two;
      scaling the determined speed value;
      generating a second temporary value by multiplying the first temporary value by the scaled determined speed value;
      generating, using a regulator transfer function (C(s)), a commanded zero sequence inverter output voltage (VO*) based on the second temporary value; and
      applying the commanded zero sequence inverter output voltage to the three level inverter with open loop gain G(s), resulting in alteration of the DC midpoint voltage.

18. The computer program product of claim 17 further comprising additional program instructions executable by the processor and the system to cause the system and processor to:
   receive the input power signal at the three level inverter; and
   output an output power signal processed by the three level inverter.

* * * * *